United States Patent [19]

Brandenstein et al.

[11] Patent Number: 4,650,398

[45] Date of Patent: Mar. 17, 1987

[54] BEARING UNIT WITH INTEGRATED PUMP

[75] Inventors: Manfred Brandenstein, Eussenheim; Rüdiger Hans, Niederwerrn; Otmar Winkler, Schweinfurt, all of Fed. Rep. of Germany

[73] Assignee: SKF GmbH, Schweinfurt, Fed. Rep. of Germany

[21] Appl. No.: 742,729

[22] Filed: Jun. 7, 1985

[30] Foreign Application Priority Data

Jun. 8, 1984 [DE] Fed. Rep. of Germany ....... 3421374

[51] Int. Cl.[4] ............................................. F04D 29/04
[52] U.S. Cl. ............................ 415/170 R; 415/170 A; 418/154; 418/23
[58] Field of Search ........... 415/170 R, 170 A, 172 R, 415/122 A, 213 T, 53 T; 417/362; 418/154, 23; 474/199, 93; 123/195 A, 198 C

[56] References Cited

U.S. PATENT DOCUMENTS

| 1,627,558 | 5/1927 | Grunwald | 474/199 |
| 1,838,497 | 12/1931 | Pennock | 417/362 |
| 3,356,033 | 12/1967 | Ullery | 415/213 T |
| 3,357,635 | 12/1967 | Ullery | 415/213 T |
| 3,536,412 | 10/1970 | Beare et al. | 415/213 T |
| 3,582,235 | 6/1971 | Ito | 415/122 A |
| 3,871,790 | 3/1975 | Rameau | 123/195 A |
| 4,451,215 | 5/1984 | Winkler et al. | 418/23 |

FOREIGN PATENT DOCUMENTS

| 8126302 | 10/1981 | Fed. Rep. of Germany . |
| 3119230 | 12/1982 | Fed. Rep. of Germany . |
| 2086000 | 5/1982 | United Kingdom | 474/199 |

Primary Examiner—Everette A. Powell, Jr.
Attorney, Agent, or Firm—Rosen, Dainow & Jacobs

[57] ABSTRACT

A bearing unit for a rotating component, such as a toothed gear or guide pulley, with an integrated pump consists of a housing with a pump chamber defined therein, a pump rotor installed in the pump chamber, a support pin having an end supported in the housing, and a bearing ring rotatably mounted on the support pin. The bearing unit is mountable on a support surface of an associated machine element, such as an engine block by means of a flange on the housing. The pump rotor and the rotating component are securely mounted on the outer surface of the bearing ring in mutual abutting relationship. The pump rotor is disposed between the housing flange and a web portion of the rotating component. The rim portion of the rotating component circumscribes the pump rotor. A sliding sealing ring is provided between the housing or housing ring and the rotating component.

10 Claims, 1 Drawing Figure

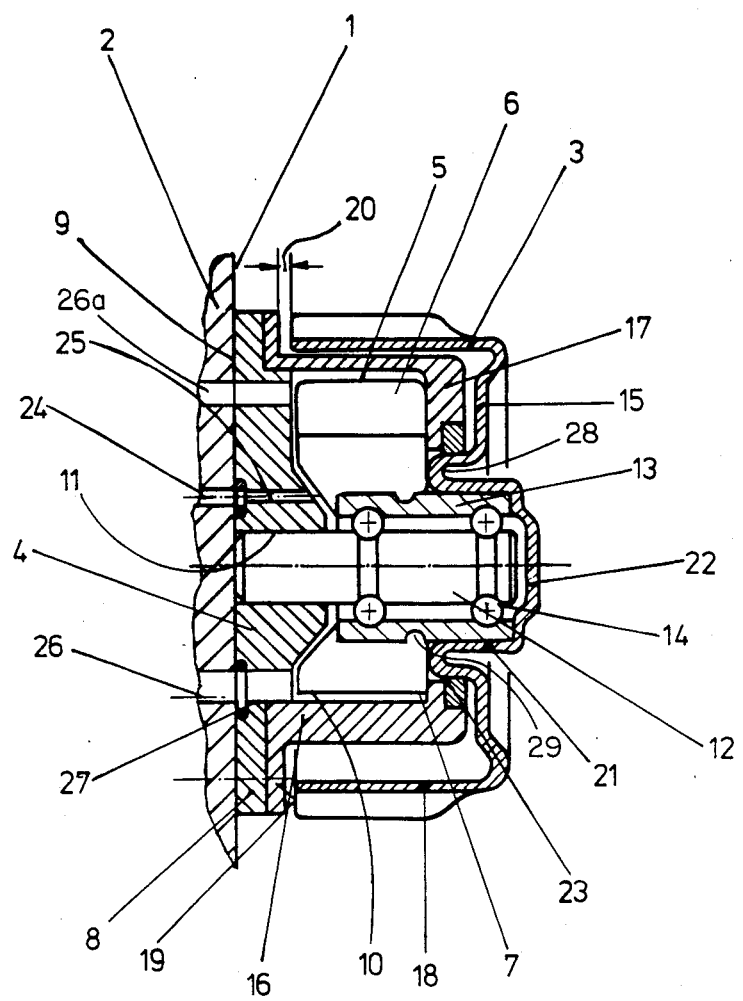

BEARING UNIT WITH INTEGRATED PUMP

FIELD OF THE INVENTION

The invention relates to a bearing unit for rotating components with an integrated pump.

BACKGROUND OF THE INVENTION

A bearing unit of the above-described type is disclosed in DE-GM No. 8126302, wherein the pump rotor is installed inside a bearing ring of a rotating component, such as a toothed gear, a belt pulley or the like. This known bearing unit is compactly built and is adapted for use with fluid pumps. When gaseous fluid is to be extracted from the pump, generally larger pump rotors are necessary. However, sufficiently large rotors cannot always be accommodated inside the bearing ring according to the known bearing unit. Thus, the known bearing unit often cannot be outfitted with the pump rotor of a vane-cell pump, such as that used in a motor vehicle to produce a vacuum.

SUMMARY OF THE INVENTION

The object of the invention is to provide a bearing unit with integrated pump of the aforementioned type which, despite a compact constructional form, permits installation of a pump rotor having an increased diameter, so that gaseous fluids can also be extracted from the pump. The bearing unit is securely mounted on an associated machine element as a pre-fabricated structural unit.

In accordance with the invention, a pump rotor having a relatively large effective diameter can be arranged outside of the bearing ring of a rotating component, such as a toothed gear, a belt guide pulley, or the like. At the same time a narrow pump chamber is formed between the rotating component and the flange of the housing, so that a bearing unit is produced which is compressed in the axial direction. This bearing unit can be delivered by the manufacturer in the form of a pre-fabricated structural unit with the pump and rotating component already mounted. The flange of the housing can be securely fastened to the support surface of an associated machine element by means of bolts or the like. The bearing unit in the form of a belt guide pulley integrated with a vacuum pump can be mounted on the internal combustion engine of a motor vehicle by means of a flange.

A further advantageous feature of the invention is that the pump chamber is tightly enclosed largely by stationary walls of the housing (i.e., the flange and housing ring) for producing low or high pressure in the fluid medium.

Both the pump rotor and the rotating component radially abut the outer surface of a bearing ring rotatably mounted on a support pin, but the rim portion of the rotating component encircles the pump rotor. This arrangement has the advantage that the radial loads acting on the pump rotor and the rim portion of the rotating component lie in approximately one and the same radial plane. In this way these forces produce no tilting moment in the bearing ring, which would cause additional loads in the support pin. Also, the radial surface in which the radial loads act lies at a relatively short distance from the housing, so that the support pin seated securely in the bore of the housing undergoes relatively small bending stresses.

BRIEF DESCRIPTION OF THE DRAWING

The preferred embodiment according to the invention will be described in detail with reference to the drawing, which is a longitudinal section of the bearing unit with integrated pump.

DETAILED DESCRIPTION OF THE PREFERRED EMBODIMENT

The bearing unit is fastened on a support surface 1 of an engine block 2. This unit serves as the bearing for the guide pulley 3 made of sheet metal which supports a toothed belt (not shown) of a belt drive arranged on the engine block 2.

The bearing unit has a housing 4 with a pump chamber 5. A pump rotor 7, made of elastic material and provided with impeller blades 6, is installed in the pump chamber 5. The pump chamber 5 for receiving the pump rotor has an eccentric outer boundary surface which encompasses the support pin 12.

The housing 4 has a flange 8 the outer wall 9 of which abuts the support surface 1 of engine block 2 and which is securely connected to the engine block 2 by means of bolts (not shown).

The inner wall 10 of the flange 8 partly defines the pump chamber 5 and is axially arranged in the vicinity of the fastened end of support pin 12 seated in a bore 11 of the housing 4. A bearing ring 13 is rotatably mounted on two rows of balls 14 arranged next to each other on the support pin 12. The balls 14 of each row run between an outer raceway groove formed in the bore of bearing ring 13 and an inner raceway groove formed on the circumferential surface of support pin 12. Consequently, the bearing ring 13 can transmit radial and axial loads of the pump rotor 7 and the guide pulley 3 to the support pin 12.

The pump rotor 7 and the guide pulley 3 are tightly arranged on the bearing ring in mutually abutting relationship. The pump rotor 7 and the guide pulley 3 are press-fit onto the bearing ring 13 so as to be secured against relative rotation.

The pump rotor 7 is arranged between the inner wall 10 of the flange 8 and a web portion 15 of guide pulley 3 which lies opposite the flange. The bore of pump rotor 7 has a radially inwardly projecting, annular projection 29 which is snapped into an annular groove in the circumferential surface of bearing ring 13 by form-locking and the pump rotor 7 is thus secured against axial displacement in either direction relative to the bearing ring. An axially extending housing ring 16 is securely connected to the outer periphery of the inner wall of flange 8 of housing 4. The housing ring 16 radially outwardly encloses the pump chamber 5.

In the foregoing case the housing ring 16 has an integrally formed, radially inwardly extending side portion 17 arranged on its free end, i.e. the end remote from flange 8. This side portion 17 encloses the pump chamber 5 on the side opposite the inner wall 10 of flange 8.

The guide pulley 3 has a rim portion 18 directly connected to the radially outer edge of web portion 15 and which extends toward the flange 8 of housing 4. The rim portion 18 has a side surface 19 on its free end which opposes a shoulder wall of housing ring 16, so that a narrow gap 20 is formed therebetween.

The guide pulley 3 has a sleeve portion 21 connected to the radially inner edge of web portion by way of an annular reinforcing rib 28 and which extends away from flange 8. Sleeve portion 21 serves as the hub of guide pulley 3. This hub 21 is securely seated on the circumferential surface of bearing ring 13 immediately adjacent the pump rotor 7. In addition, the end of the hub 21 of guide pulley 3 is connected to a base portion 22 which axially outwardly closes the bore of the bearing ring 13.

Between the reinforcing rib 28 of guide pulley 3 and the radially inner edge of side portion 17 of the housing ring 16 a sealing ring 23 slides on the reinforcing rib and hermetically seals the pump chamber 5 from the outside.

Not only the balls 14 but also the pump rotor 7 will be lubricated with oil, which is supplied to the pump chamber 5 and the bearing chamber between bearing ring 13 and support pin 12 by way of the supply duct 24 in engine block 2 and the connecting inlet port 25 in housing 4. The engine block 2 also has a conventional inlet duct 26a and a conventional outlet duct 26 which is connected to a discharge port 27 of housing 4, so that circulation of the lubricating oil is enabled. The oil supply duct 24 is directly connected to a pressurized oil lubrication line (not shown) of the engine block of the internal combustion engine.

The foregoing description of the preferred embodiment is presented for illustrative purposes only and is not intended to limit the scope of the invention as defined in the appended claims. Modifications may be readily effected by those having ordinary skill in the art without departing from the spirit and scope of the inventive concept herein disclosed. For example, the bearing ring 13 can be formed as a sleeve bearing rotatably mounted directly on the support pin 12. Furthermore, the pump rotor and/or other rotating parts can be integrally formed with the bearing ring 13. In the same way, the housing ring 16 can be integrally formed with the flange 8 of housing 4.

Moreover, the radially inwardly extending side portion 17 of housing ring 16 can be eliminated, so that the web portion 15 of guide pulley 3 encloses the pump chamber on the side opposite the flange 8 of the housing 4.

What is claimed is:

1. In a bearing unit for a rotating component with an integrated pump which is mountable on an associated machine element, the rotating component having a cylindrical portion and a radially inwardly extending portion depending therefrom, comprised of a housing at least partly defining a pump chamber, a pump rotor installed in said pump chamber, a support pin securely supported at an end thereof by said housing, and a bearing ring securely connected to said pump rotor and said rotating component and rotatably mounted on said support pin, the improvement wherein said housing comprises a flange having an outer wall adapted to abut a support surface of said associated machine element and an inner wall partly defining said pump chamber, said pump rotor being positioned axially between said inner wall and the radially inwardly extending portion of said rotating component and radially within said cylindrical portion, said pump rotor being mounted on the radially outer surface of said bearing ring whereby relative rotation of said pump rotor and said bearing ring is precluded.

2. The bearing unit of claim 1, further comprising a housing ring securely connected to said housing and having a portion extending axially with respect to said inner wall of said flange, wherein said housing ring portion defines at least a part of the outer radial surface of said pump chamber.

3. The bearing unit of claim 2, wherein said housing ring further comprises a radially inwardly extending side portion on the side of said pump chamber opposite to said inner wall of said flange.

4. The bearing unit of claim 1, wherein said cylindrical portion extends from said radially inwardly extending portion in the direction of said flange of said housing.

5. The bearing unit of claim 4, wherein said cylindrical portion of said rotating component has a side surface disposed to form a narrow gap between the end thereof away from said radially inwardly extending portion and a surface of said housing.

6. The bearing unit of claim 1, wherein said radially inwardly extending portion of said rotating component comprises a hub securely seated on the outer surface of said bearing ring.

7. The bearing unit of claim 6, wherein said radially inwardly extending portion of said rotating component comprises a base portion connected to said hub and covering the outer end of the bore of said bearing ring.

8. The bearing unit of claim 2, further comprising a sliding sealing ring, said sealing ring being arranged between said housing ring and said radially inwardly extending portion of said rotating component.

9. The bearing unit of claim 1, wherein said pump rotor and said rotating component are securely mounted on said bearing ring in an abutting relationship with each other.

10. The bearing unit of claim 1, wherein said housing has a surface partly defining said pump chamber which eccentrically circumscribes said support pin and enables installation of a pump rotor in said chamber having a plurality of rotor blades.

* * * * *